Patented Feb. 9, 1926.

1,572,839

UNITED STATES PATENT OFFICE.

GEORGE W. BLAIR, OF WABASH, INDIANA.

BAKED-ENAMEL REMOVER.

No Drawing.  Application filed March 26, 1924.  Serial No. 702,150.

*To all whom it may concern:*

Be it known that I, GEORGE W. BLAIR, a citizen of the United States, residing at Wabash, in the State of Indiana, have invented new and useful Improvements in Baked-Enamel Removers, of which the following is a specification.

The present invention relates to a finish remover and has special reference to a composition for the removal of baked enamel from surfaces.

It is well known that baked enamel adheres very tenaciously to material to which it has been applied, particularly to metal surfaces. Most of the ordinary paint removers will not have any effect on baked enamel, and those few of the paint removers heretofore proposed which do have any action whatever on the baked enamel do not remove the same readily or perfectly from the surfaces.

Metal articles which have been coated with enamel and baked, such as parts of radiators, accordingly have to be removed and separately treated, when removing the paint from an automobile for repainting.

In accordance with the present invention I have provided a remover which can be applied to surfaces coated with baked enamel, this being applied in the usual manner of applying paint removers, and after being allowed to stand for a short time, the enamel can be readily scraped off with a putty knife in the same manner as paint and varnish are ordinarily removed.

In its preferred composition the remover consists of four quarts of shellac, three quarts of lacquer, one quart of strong aqua-ammonia and four pounds of hard paraffin wax.

In preparing the composition the paraffin wax is first added to the shellac and dissolved at a temperature of 210 degrees Fahrenheit and should be stirred while paraffin is being dissolved.

The paraffin should be cut up in shavings first, which will shorten the necessary time of dissolving.

After the paraffin has been thoroughly dissolved in and mixed with the shellac, there is added one quart of strong ammonia water (say 25–28%) and thoroughly mixed.

This mixture is allowed to stand six or seven days. Then add three quarts of lacquer and mix at a temperature of 90 or 95 degrees Fahrenheit.

The remover is then ready for use.

I do not employ strong chemicals in this enamel remover and I do not add benzol, alcohol or any of the other similar ingredients which are commonly used in paint removers.

The remover can be applied with a brush or swab, one coating being sufficient. After being allowed to stand for a time depending upon the toughness of the enamel, and the condition of the enamel, it can be scraped off with a putty knife or the like. The amount of time necessary for softening the baked enamel sufficiently to scrape off readily, will vary between about one hour and about five hours.

The proportions as stated in the above example are those which I have found to give most satisfactory results. It will be understood, however, that the proportions can be varied more or less.

The shellac that I use in making this enamel remover are orange, garnet and liver, namely the three different varieties of commercial shellac.

The lacquer that I use in making this enamel remover is a soluble gun-cotton product, sometimes called amyl acetate lacquer.

I have provided a remover which is especially adapted for removing asphaltum enamels that have been baked on automobile bodies or parts such as fenders, hoods and radiator shells, or any metal parts.

I claim:—

1. A liquid composition suitable for removing baked enamel from surfaces, comprising a major proportion of shellac, smaller proportions of lacquer and paraffin wax, and a still smaller proportion of aqua-ammonia.

2. A liquid baked enamel remover containing: shellac, 1 gallon; lacquer, 3 quarts; paraffin wax, 4 pounds; aqua-ammonia, 1 quart.

In testimony whereof I affix my signature.

GEORGE W. BLAIR.